United States Patent

Kaye

[11] Patent Number: 5,911,793
[45] Date of Patent: Jun. 15, 1999

[54] TRANSMISSION WITH SEMI-FLOATING SHAFTS

[76] Inventor: Kenneth B. Kaye, 10277 S. Appaloosa Ave., Floral City, Fla. 34436

[21] Appl. No.: 08/861,523

[22] Filed: May 22, 1997

[51] Int. Cl.⁶ .................................................. F16H 57/02
[52] U.S. Cl. ........................................... 74/606 R; 74/745
[58] Field of Search ................... 74/606 R, 335, 74/417; 475/246, 71; D15/149

[56] References Cited

U.S. PATENT DOCUMENTS

| | | |
|---|---|---|
| D. 350,358 | 9/1994 | Kaye . |
| 1,887,560 | 11/1932 | Matthews ............................. 74/606 R |
| 4,223,566 | 9/1980 | Yamamori et al. ................... 74/606 R |
| 4,628,768 | 12/1986 | Omura et al. .............................. 74/745 |
| 4,787,271 | 11/1988 | Brogden . |
| 4,864,881 | 9/1989 | Beeson et al. ......................... 74/467 X |
| 4,901,590 | 2/1990 | Inui et al. . |
| 5,024,122 | 6/1991 | Parzl et al. . |
| 5,058,456 | 10/1991 | Manrique et al. ..................... 74/606 R |
| 5,058,459 | 10/1991 | Nemoto et al. ............................ 74/745 |
| 5,097,717 | 3/1992 | Bardoll ............................. 74/606 R X |
| 5,142,940 | 9/1992 | Hasegawa .............................. 74/606 R |
| 5,284,067 | 2/1994 | Seaman .................................. 74/606 R |
| 5,343,774 | 9/1994 | Jang . |
| 5,404,772 | 4/1995 | Jester . |
| 5,509,329 | 4/1996 | Jackson et al. ........................ 74/606 R |

FOREIGN PATENT DOCUMENTS 2179712  3/1987  United Kingdom ................. 74/606 R

*Primary Examiner*—Vinh T. Luong
*Attorney, Agent, or Firm*—Stein, Schifino & Van Der Wall

[57] ABSTRACT

A transmission for propeller driven vehicles comprising semi-floating input and output shafts rotatably supported in a main gear case. The shafts are supported on bearings which are free from any locking engagement with the shafts. The bearings are secured in bearing bores positioned in both the bell housing and the main gear case. A vent tube is positioned in the bell housing which is aligned with the output shaft such that the output shaft rotates about the vent tube. Also, an opening is created between the junction of the bell housing and the engine of the vehicle to be propelled. This opening acts as an air induction duct for receiving air for cooling the transmission.

17 Claims, 9 Drawing Sheets

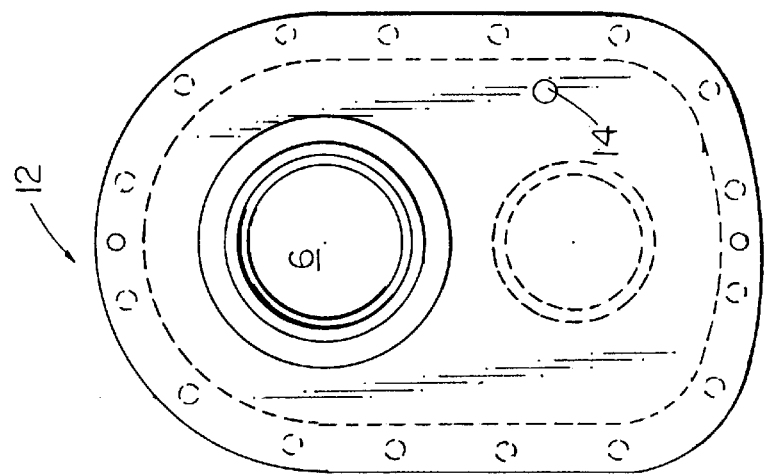
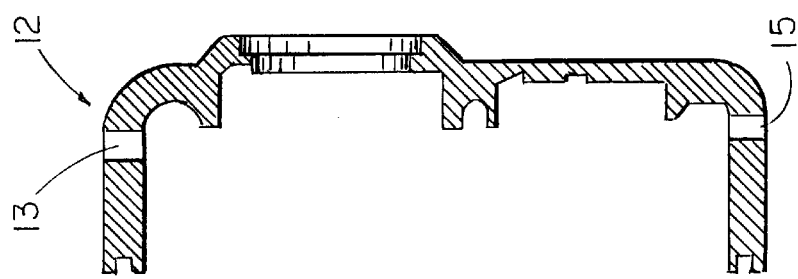
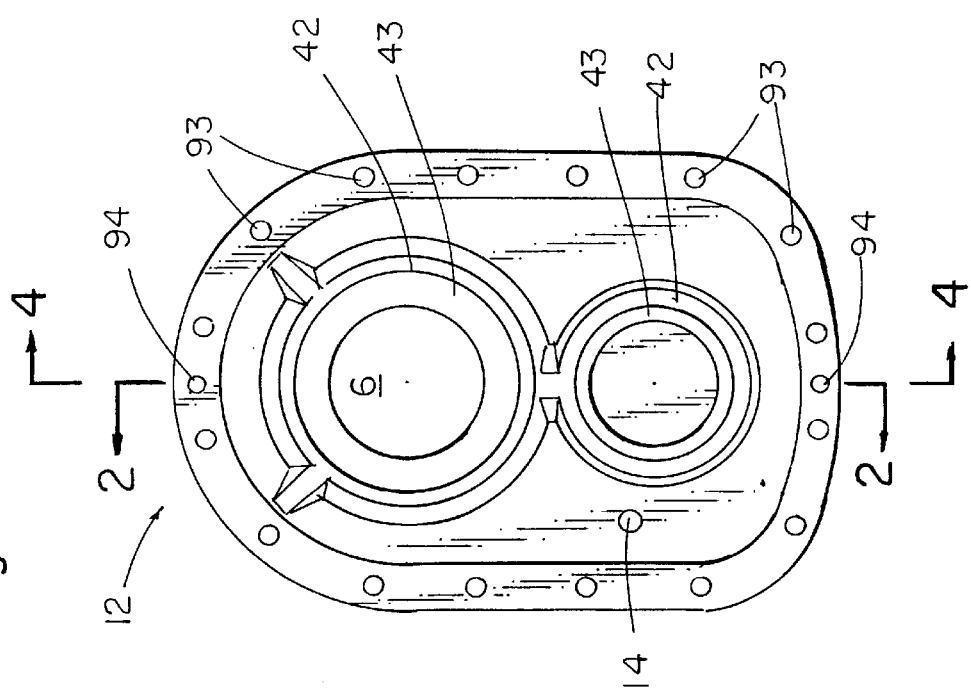

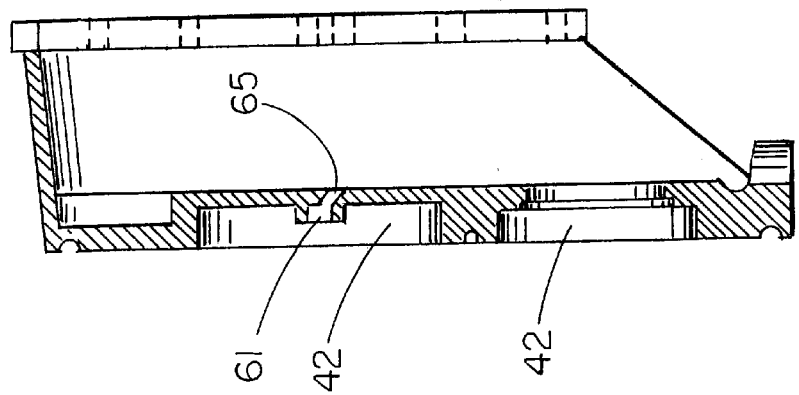
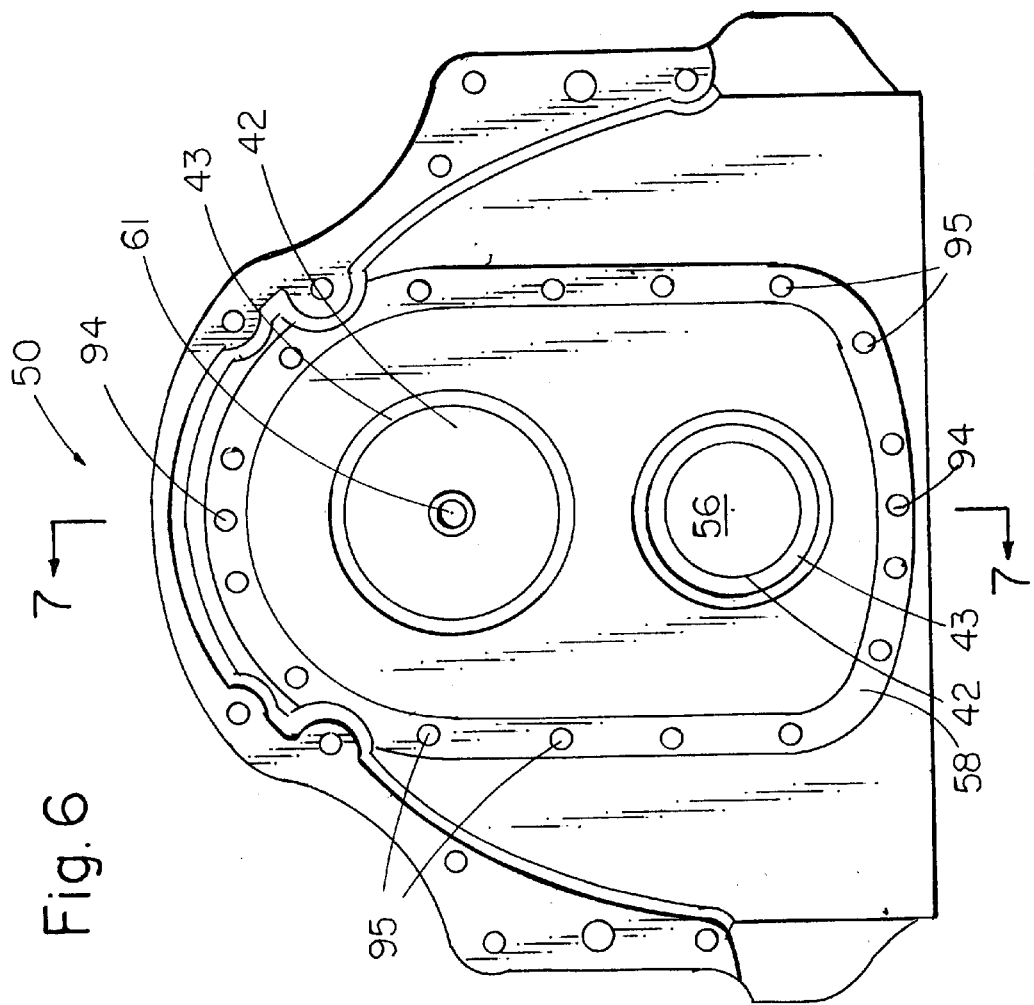

TRANSMISSION WITH SEMI-FLOATING SHAFTS

BACKGROUND OF THE INVENTION

1. Field of the Invention

The present invention relates to transmissions. This invention more particularly pertains to a transmission with semi-floating shafts and a venting means capable of being inverted to withstand the gyroscopic forces typically associated with propeller driven vehicles.

2. Description of the Background Art

Presently, most commercially available transmissions available for propeller driven vehicles such as airboats are not capable of withstanding the gyroscopic forces created by the propeller and the engine for extended periods of time and still maintain sufficient power to propel the vehicle. Typically, these known transmissions often break and/or leak. Transmissions for propeller vehicles require some flexibility in that the materials used to create the transmissions often expand at different rates as a result of heat and friction. Moreover, the gyroscopic forces adversely affect the minimal tolerances needed in a transmission for peak performance. Furthermore, these known transmissions often overheat which limits the range of power a particular model of transmission may have.

In response to the realized inadequacies of these earlier transmissions, it became clear that there is a need for a transmission capable of withstanding extreme gyroscopic forces with increased performance capability. This device must provide for the tolerances necessary to manufacture and produce a transmission capable of peak performance over an extended period of time. In as much as the art consists of various types of transmissions, it can be appreciated that there is a continuing need for and interest in improvements to transmissions for propeller driven vehicles, and in this respect, the present invention addresses these needs and interests.

Therefore, the principal object of this invention is to provide an improvement which overcomes the aforementioned inadequacies of the prior art devices and provides an improvement which is a significant contribution to the advancement of the transmission art.

Another object of this invention is to provide a new and improved transmission for propeller driven vehicles which has all the advantages and none of the disadvantages of the earlier transmissions.

Still another objective of the present invention is to provided a transmission which is capable of withstanding gyroscopic forces created between the propeller and the engine.

Yet another objective of the present invention is to provide a transmission which is easily manufactured and assembled.

Still a further objective of the present invention is to provide a transmission with semi-floating shafts.

Yet a further objective is to provide a transmission with a vent means for venting the main gear case.

An additional objective is to provide an air induction duct for cooling the transmission.

Another objective is to provide a transmission for an engine comprising, in combination a main gear case coupled to the engine; a semi-floating input shaft rotatably supported in the main gear case; a semi-floating output shaft rotatably supported in the main gear case; a plurality of bearings semi-floating about the semi-floating input and output shafts, the plurality of the bearings coupled to the main gear case, and the semi-floating shafts being otherwise free of locking engagement with the plurality of bearings; and a gear means for rotation with the semi-floating input and output shafts, the gear means mounted to the semi-floating input and output shafts.

Even yet another objective is to provide a transmission for an engine comprising, in combination: a main gear case coupled to the engine; an input shaft rotatably supported in the main gear case; an output shaft rotatably supported in the main gear case, the output shaft being at least partially hollow; a vent means for venting the main gear case, the venting means aligned with the output shaft, the output shaft rotating about the vent means; a plurality of bearings about the input and output shafts, and the plurality of the bearings coupled to the main gear case; and a gear means for rotation with the input and output shafts, the gear means coupled to the input and output shafts.

Still yet another objective is to provide a transmission for an engine comprising, in combination: a main gear case coupled to the engine; an input shaft rotatably supported in the main gear case; an output shaft rotatably supported in the main gear case; a bell housing adapted to cooperate with the engine, the bell housing coupled between the main gear case and the engine; an opening created between the bell housing and the engine when the bell housing is adapted to the engine, the opening for cooling; a plurality of bearings about the input and output shafts, and the plurality of the bearings coupled to the main gear case; and a gear means for rotation with the input and output shafts, the gear means coupled to the input and output shafts.

The foregoing has outlined some of the pertinent objects of the invention. These objects should be construed to be merely illustrative of some of the more prominent features and applications of the intended invention. Many other beneficial results can be obtained by applying the disclosed invention in a different manner or by modifying the invention within the scope of the disclosure. Accordingly, other objects and a more comprehensive understanding of the invention may be obtained by referring to the summary of the invention, and the detailed description of the preferred embodiment in addition to the scope of the invention defined by the claims taken in conjunction with the accompanying drawings.

SUMMARY OF THE INVENTION

The present invention is defined by the appended claims with the specific embodiment shown in the attached drawings. The present invention is directed to an apparatus that satisfies this need for an improved transmission capable of withstanding the gyroscopic forces and the heat generated by an engine driving a propeller. For the purpose of summarizing the invention, the invention comprises a main gear case, semi-floating input and output shafts, a plurality of bearings, drive gear and driven gear.

In the preferred embodiment, the semi-floating input and output shafts are supported in the main gear case. A bearing is placed over each end of each shaft. However, the shafts are free of any locking engagement with the bearings. In other words, the inner track of any bearing is not mounted or affixed to a shaft in any way. The inner track is free to rotate about the shaft. Moreover, the shafts are free to move longitudinally in the bearings. This flexibility in coupling the bearings with the shafts allows the transmission to withstand extreme forces and vibrations as well as aid in the assembly and disassembly of the transmission.

In the preferred embodiment, the present invention further comprises a bell housing adapted to cooperate with the engine of the vehicle. The bell housing is to be coupled between the engine of the vehicle and the main gear case. The bell housing and the main gear case each have a plurality of contrapositioned bearing bores for receiving the plurality of bearings. A bearing having been received in a bearing bore in the main gear case would then have an opposite bearing on the bell housing. The opposite bearings in their respective bearing bores rotatably support a shaft therebetween.

In the present invention, an opening is created between the bell housing and the engine when the bell housing is adapted to the engine. This opening allows for the transmission to run cooler and, therefore, allows the transmission to run for extended periods of time with increased power. In the preferred embodiment, an air induction duct is created between the engine and the bell housing. In an airboat, a propeller behind the boat pushes the boat through the water. The air induction duct in front of the transmission and propeller receives air forced into the bell housing as the boat is pushed which allows the main gear case to run cooler.

The preferred embodiment also includes a vent tube for venting the main gear case. The vent tube is coupled to the bell housing and co-axially aligned with the output shaft. The output shaft must be at least partially hollow so that an end of the vent tube is rotated about by the output shaft. It is preferable that the entire output shaft be hollow because of weight. Positioning this vent as such allows the transmission to achieve a multitude of orientations without leaking.

An important feature of the present invention is that extreme tolerances are maintained between the components during manufacture and assembly of the present invention even though the transmission will undergo gyroscopic forces which alter the dimensions of the components during operation. Therefore, it can be readily seen that the present invention provides a means to allow the input shaft and output shaft to float within the main gear case. Moreover, it can be seen that the vent tube allows the main gear case to be adequately vented without leaking. Thus, a transmission with semi-floating shafts with improved venting and cooling would be greatly appreciated.

The foregoing has outlined rather broadly, the more pertinent and important features of the present invention. The detailed description of the invention that follows is offered so that the present contribution to the art can be more fully appreciated. Additional features of the invention will be described hereinafter. These form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more succinct understanding of the nature and objects of the present invention, reference should be directed to the following detailed description taken in connection with the accompanying drawings in which:

FIG. 3 is a rear elevational view of the inside of the main gear case in the preferred embodiment;

FIG. 4 is a partial sectional view of FIG. 3 along lines 4—4 showing the left side view of the main gear case in the preferred embodiment;

FIG. 5 is a front elevational view of the front of the main gear case in the preferred embodiment;

FIG. 6 is a front elevational view of the preferred embodiment of the bell housing;

FIG. 7 is a partial sectional view of FIG. 6 along lines 7—7 showing the right side view of the preferred embodiment of the bell housing;

Similar reference characters refer to similar parts throughout the several views of the drawings.

DETAILED DESCRIPTION OF THE PREFERRED EMBODIMENT

Figure 1:
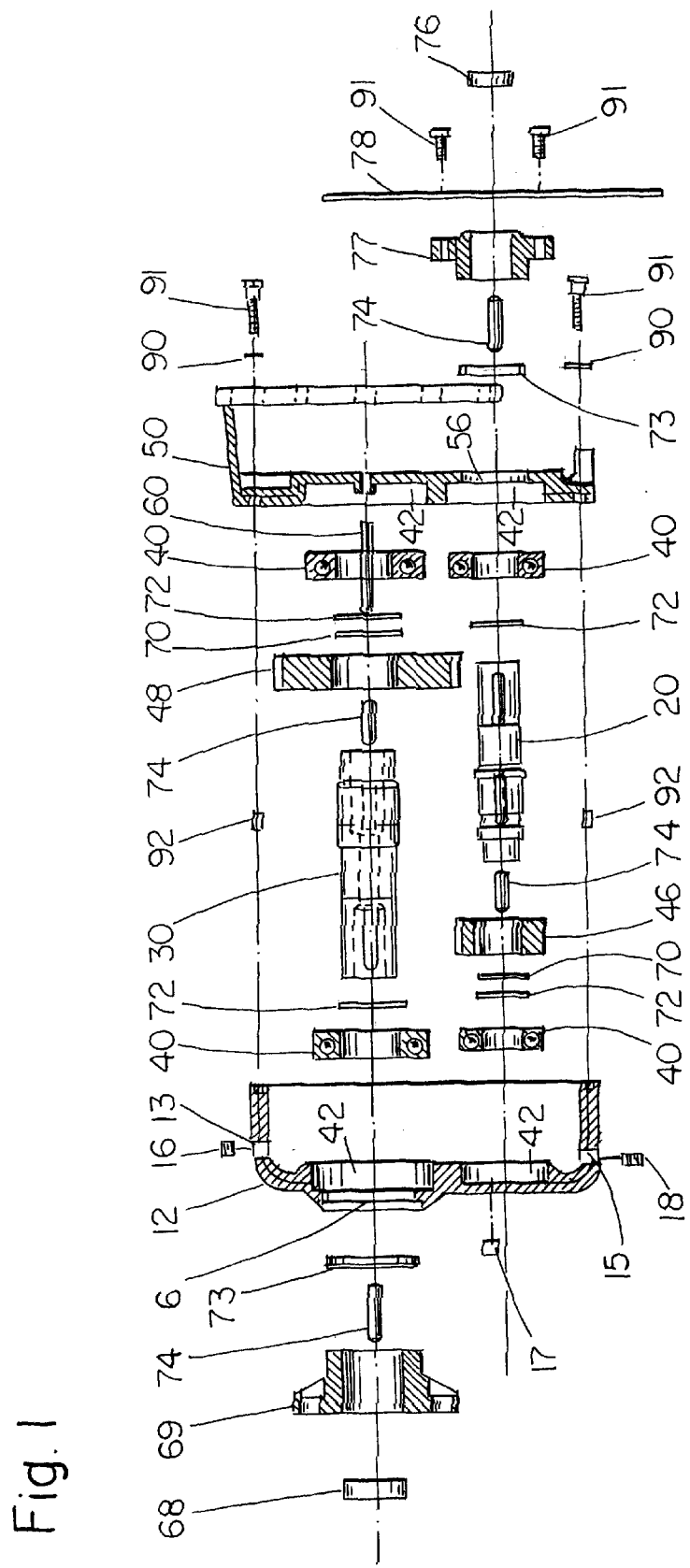
FIG. 1 is an exploded, sectional, right side view of the preferred embodiment of the present invention.

With reference to the drawings, and in particular to FIG. 1 thereof, a new and improved transmission embodying the principles and concepts of the present invention and generally designated by the reference number 10 will be described. As shown in FIG. 1, the preferred embodiment of the present invention which may be adapted for use with propeller driven vehicles comprises a bell housing 50 and a main gear case 12 coupled to the engine 8 of the vehicle. A semi-floating input shaft 20 and a semi-floating output shaft 30 are rotatably supported in the main gear case 12. A drive gear 46 and a driven gear 48 are mounted to the shafts 20, 30. In the preferred embodiment the main gear case 12 and the bell housing 50 should be cast of Aluminum alloy, classified as #535, with approximately 12% elongation. The general sectional change is approximately ¾ in. thick or thicker on both the bell housing 50 and the main case 12. Also, the semi-floating shafts 20, 30 and the gears 46, 48 are made of steel. The preferred gear ratio is in the approximate range of 1.25 or 3 to 1. In other words, the engine 8 and the input shaft 20 turns between 1.25 or 3 times for every one rotation of the output shaft 30. Normally, most transmissions for airboats are about 2 to 1.

Figure 14:
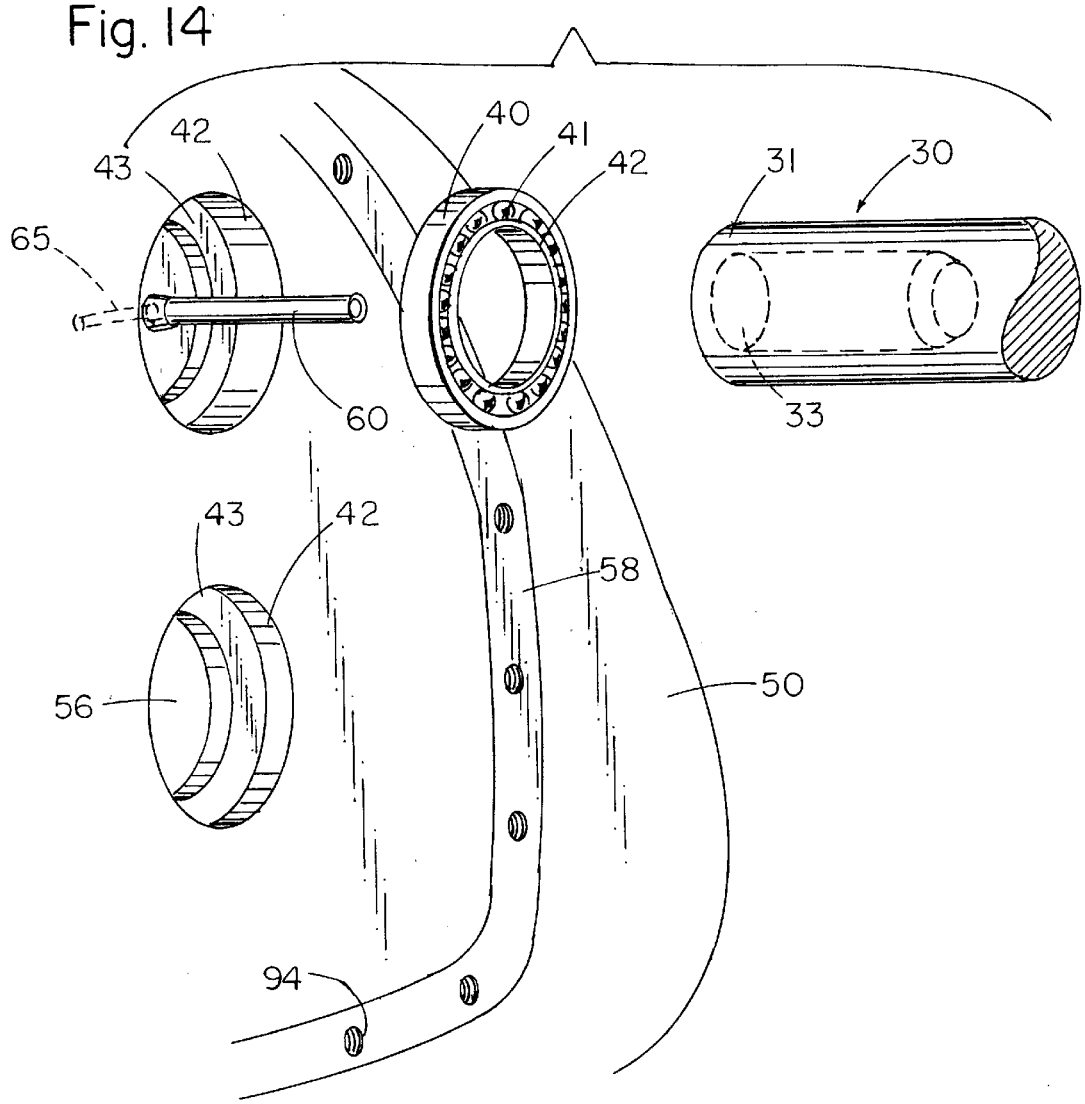
FIG. 14 is an exploded perspective view of a semi-hollow output shaft and bearing to be received in the bearing bore on the bell housing about the vent tube.

In order to support the shafts, both the bell housing 50 and the main gear case 12 have contrapositioned bearing bores 42 for receiving the bearings 40. The bearings 40 semi-float about the shafts 20, 30 such that the shafts are otherwise free of locking engagement with the bearings 40. The shafts are said to be semi-floating in that there is some clearance between the shafts 20, 30 and the bearings 40. The shafts 20,30 are free to rotate within the bearings 40 and, moreover, are free to move longitudinally in the bearings 40. In other words, inner track 42 of the bearing 40 is not affixed to any shaft 20, 30 as best shown in FIG. 14. The bearings 40 are slip fitted on to the shafts 20, 30. The tolerances associated with this slip fit between bearings 40 and the shafts 20, 30 are in the area of 0.0001 in. to 0.0005 in. However, during operation of the present invention, heat and friction practically eliminate any clearance between a bearing 40 and a shaft 20, 30.

While the transmission heats up, the shafts 20, 30 are free to expand longitudinally within the bearings 40 and, therefore, the fixed gears 46, 48 are allowed to continuously mate while the shafts 20, 30 are supported in the main gear case 12 without pushing apart the main gear case 12 from the bell housing 50. If the bearings where fixed, when the shafts 20, 30 heat up, their longitudinal expansion forces the transmission to expand and come apart. Also, because the bearing 40 is slip fit onto a shaft 20, 30 and is, therefore, not tight, the shaft 20, 30 more easily move upon initially starting the transmission 10. Moreover, slip fitting the bearings 40 on to the shafts 20, 30 allows the transmission 10 to better withstand the gyroscopic forces created by a propeller and contributes to the ease of assembly and disassembly of the transmission 10.

The bearings 40 are heat shrunk into the bell housing 50 and the main gear case 12. The bell housing 50 is heated up to 180 to 200 degrees Fahrenheit before a pair of bearings 40 are inserted in each bearing bore 42, respectively. The inventor has discovered that it is critical to heat the components of the present invention and shrink them in to place rather than press them into place which would likely damage components such as the bearing bores 42 in the bell housing 50 and the main gear case 12. In propeller driven vehicles, since the output shaft 30 and its respective bearings 40 handle the load from the propeller, bigger gears and bigger bearings than those on the input shaft 20 may be necessitated because of the increased stress.

Figure 8:
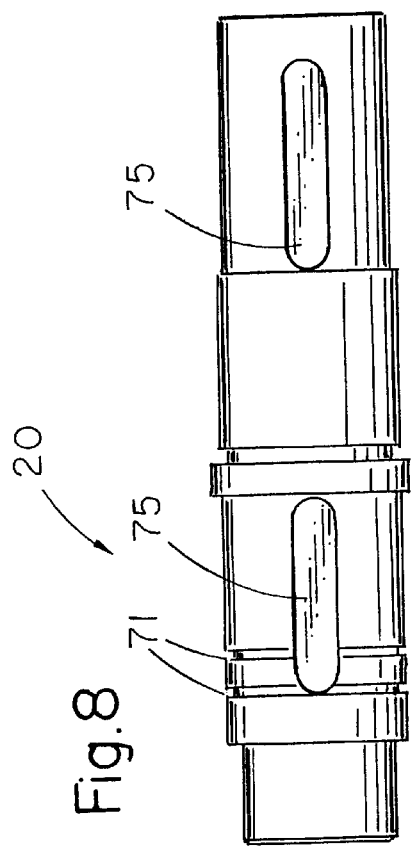
FIG. 8 is a top plan view of the preferred embodiment of the input shaft.
Figure 10:
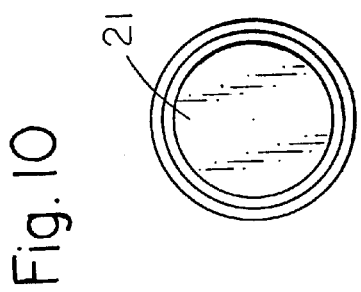
FIG. 10 is a left side elevation of the preferred embodiment of the input shaft.

The drive gear 46 is heated to 350 to 400 degrees F. and shrunk on to the input shaft 20 which creates a permanent tight fit. A drive gear 46 should be selected which has an inner diameter 0.0015 smaller than the input shaft 20. A key 74 may be used to secure the drive gear 46 in place on the shaft 20 but may not be necessary where there is a proper fit as a result of heat shrinking. A snap ring 70 fitted into snap ring groove 71 as shown in FIG. 8, followed by a spacer 72 on each end 21, 22 of the input shaft 20, then serves as a replaceable wear ring so that the input shaft 20 will not be damaged.

The driven gear 48 is also heat shrunk onto the output shaft 30 by heating the driven gear up to 350 to 400 degrees F. Here, the driven gear 48 should have an inner diameter about 0.002 in smaller than the diameter of the output shaft 30. A key 74 may be used here but is not necessary. Snap ring 70 is placed in snap ring groove 71 on output shaft 30 and spacers 72 are placed on each end 31, 32. Because the output shaft 30 is semi-floating, there is no need for a groove on the shaft 30 between the propeller hub 69 and the bearing 40 in the main gear case 12 that would normally be on a shaft to affix a bearing to a shaft. Thus, a smaller and lighter output shaft 30 may be used instead of a larger shafted having a groove which is likely to break at the groove when a substantial load is placed upon it. The smaller shaft is stronger and will last longer because of the absence of any grooves at the load bearing end.

As shown in FIG. 6, the bell housing 50 has a recessed circular seam 58 for receiving the main gear case 12. Silicon, suitable for use with oil, is placed in the seam 58 and acts as an o-ring after drying. An input shaft hole 56 at the center of a bearing bore 42 is at the bottom of the bell housing 50 for receiving the end 22 of the input shaft 20. In the upper bearing bore 42 is a vent hole 61 sized to receive a vent tube 60 for relieving pressure in the transmission to be lock-tight into the bell housing 50. Preferably the hole is ⅜ in from the front of the bell housing 50, but does not entirely penetrate through the bell housing 50. An angled hole 65 of approximately 0.090 in. is drilled in through the back of the bell housing 50 at an angle such that when the vent tube 60 is in hole 61, hole 65 intersects with the vent tube 60. The angled hole 65 prevents water and other pollutants from mixing with the oil. Centrifugal force keeps any oil from going up the tube 60 but otherwise lets it vent. This positioning of the vent tube 60 allows the transmission 10 to operate in any position, even upside down, in an aircraft.

Figure 12:
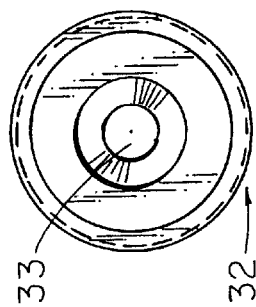
FIG. 12 is a right side elevation of the preferred embodiment of the output shaft.
Figure 11:
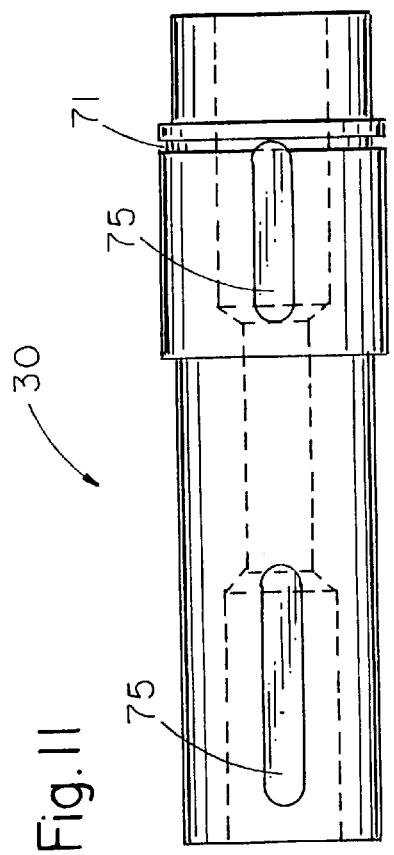
FIG. 11 is a top plan view of the preferred embodiment of the output shaft.
Figure 13:
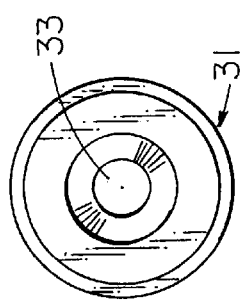
FIG. 13 is a left side elevation of the preferred embodiment of the output shaft.

The output shaft 30 revolves around the vent tube 60 as best shown in FIG. 14. The upper bearing bore 42 has a protruding lip 43 about the outer circumference of the bearing bore 42. When the bearing 40 is placed into such a bearing bore 42 with a protruding inner circumferential lip 43, the bearing 40 does not seat entirely against the front of the bell housing 50. Thus, the pressure is allowed to escape between the inner and outer tracks 41, 42 of the bearing 40 to between the bearing 40 and the bell housing 50 and into the inside of the end 31 of the output shaft 30. The vent tube 60 is to be co-axially aligned with the output shaft 30. In the preferred embodiment, the output shaft 30 is entirely hollow with a hole 33 as shown in FIGS. 11 through 13. However, in alternative embodiment, the output shaft 30 is semi-hollow and has an opening 33 as shown in FIG. 14. In either case, the output shaft is adapted to rotate about the vent tube 60 and the pressure is allowed to escape through the vent tube 60 to the other side of the bell housing 50. Furthermore, where the ball bearings in a bearing 40 may extend beyond the width of the tracks 41, 42, the bearing 40 must offset in every bearing bore 42 of the bell housing 50 and the main gear case 12. The protruding inner circumferential lip 43 also serves this purpose of keeping the ball bearings in the bearings 40 from contacting the bell housing 50 or the main gear case 12.

A pair of dowel pins 92 are placed in dowel pin holes 94, as shown in FIGS. 3 and 6 in order to properly align the main gear case 12 with the bell housing 50. Once the main gear case 12 is positioned onto the bell housing 50 in the seam 58 with the end 22 of the input shaft extending through the hole 56 of the bell housing, the end 31 of the output shaft extending through the hole 6 of the main gear case 12, and the drive gear 46 mating with the driven gear 48, bolts 91 with lock washers 90 are placed completely through the bolt holes 95 in the bell housing 50 shown in FIG. 6 and tightened into the threaded bolt receiving holes 93 in the main gear case 12 shown in FIG. 3. The bolts should be equal length and spaced relatively equally apart. Bolts of equal length are preferred because the transmission 10 will be stronger than if some were of varying lengths. Moreover, having bolts of equal length makes the assembly of the transmission muck easier and quicker.

Figure 15:
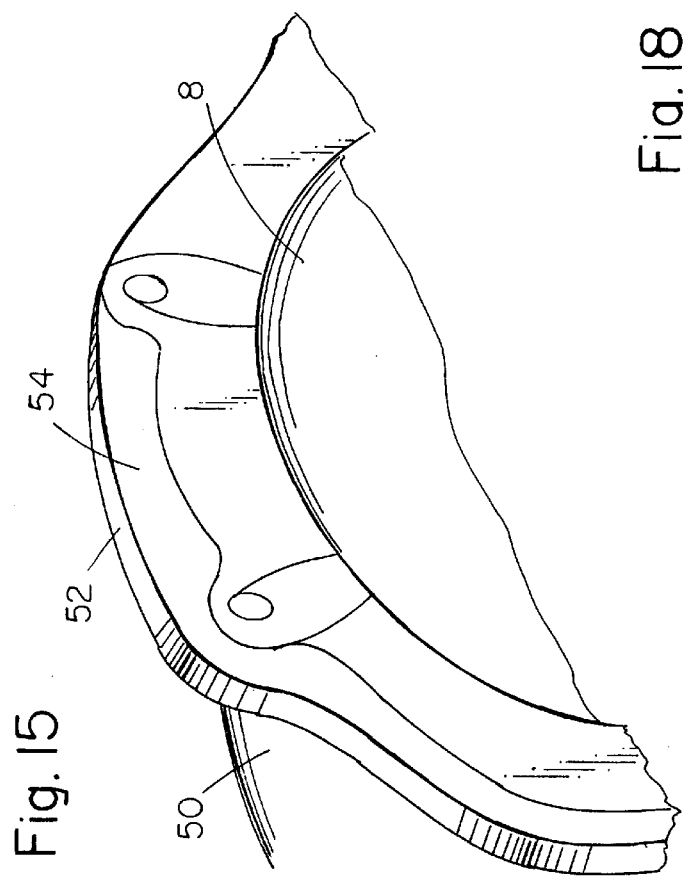
FIG. 15 is a partial perspective view of the air induction duct created between the bell housing and the engine.

The preferred embodiment of the present invention also comprises an opening 54 for cooling as shown in FIG. 15.

The opening 54 is created between the bell housing 50 and the engine 8 when the bell housing 50 is adapted to the engine 8. A peripheral edge 52 of the bell housing 50 extends above the engine 8 when the bell housing 50 is adapted to the engine 8. The opening 54 becomes an air induction duct 54 when the opening is forced into the air on a vehicle pushed from behind with a propeller. With the greater cooling capacity of the present invention, greater horsepower may be achieved. Because in the preferred embodiment the bell housing 50 is Aluminum, heat is quickly pulled out of the main gear case 12 as well.

Figure 2:
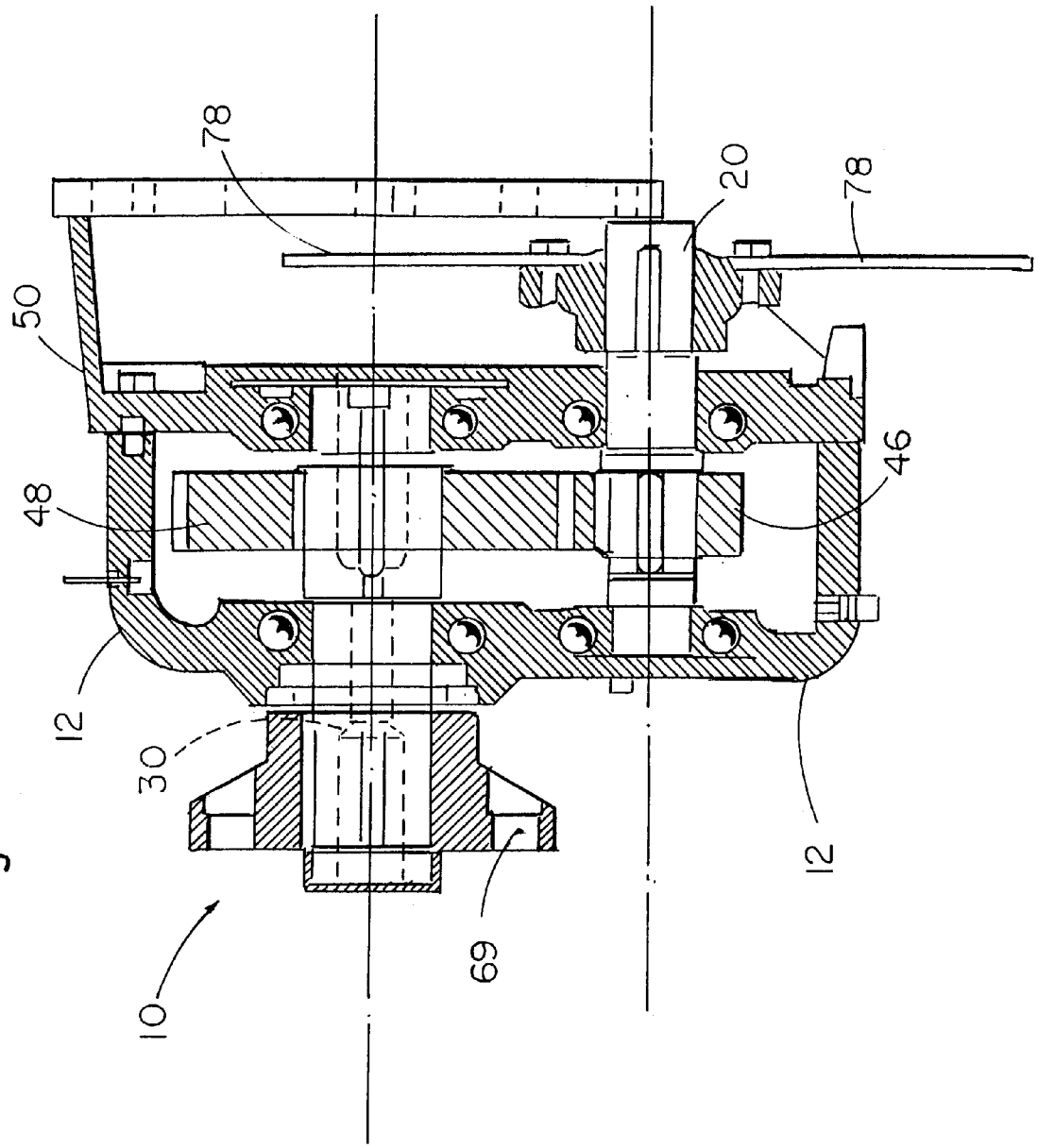
FIG. 2 is a sectional view of FIG. 3 along lines 2—2 showing the right side view of the preferred embodiment of the present invention fully assembled.
Figure 9:
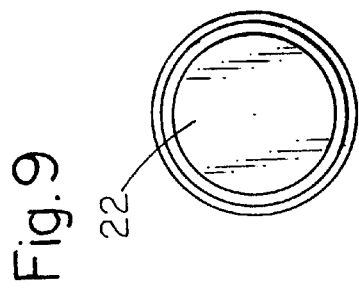
FIG. 9 is a right side elevation of the preferred embodiment of the input shaft.

As shown in FIGS. 1 and 2, a seal 73 is placed over the end 31 of the output shaft 30 and into the hole 6 of the main gear case 12. A propeller hub 69 is heated to approximately 300 to 350 degrees F. and then placed on the end 31 of the output shaft 30 and allowed to cool. The propeller hub is secured into place with a key 74. The propeller hub 69 may be removed from the output shaft 30 by heating it back up until it expands. The configuration of the propeller hub is to match the propeller which is to be used. A prop dowel 68 as shown in FIGS. 1 and 2 is placed over the end 31 of the output shaft 30 to seal off the output shaft 30. The prop dowel is also to be heated up to approximately 250 degrees F. and shrunk on to the shaft 30 by cooling.

Figure 18:
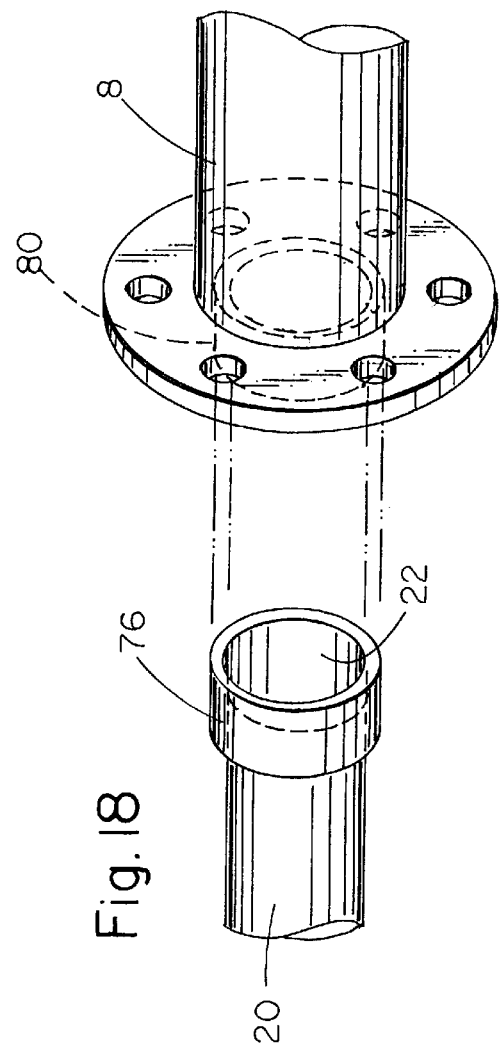
FIG. 18 is an exploded partial perspective view of the preferred embodiment of the input shaft and the crankshaft of an engine being coupled together with a pilot bushing.
Figure 17:
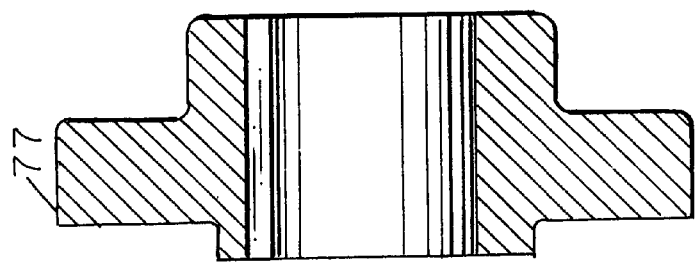
FIG. 17 is a partial sectional view of FIG. 16 along lines 17—17 showing the view of the preferred embodiment of the drive hub.
Figure 16:
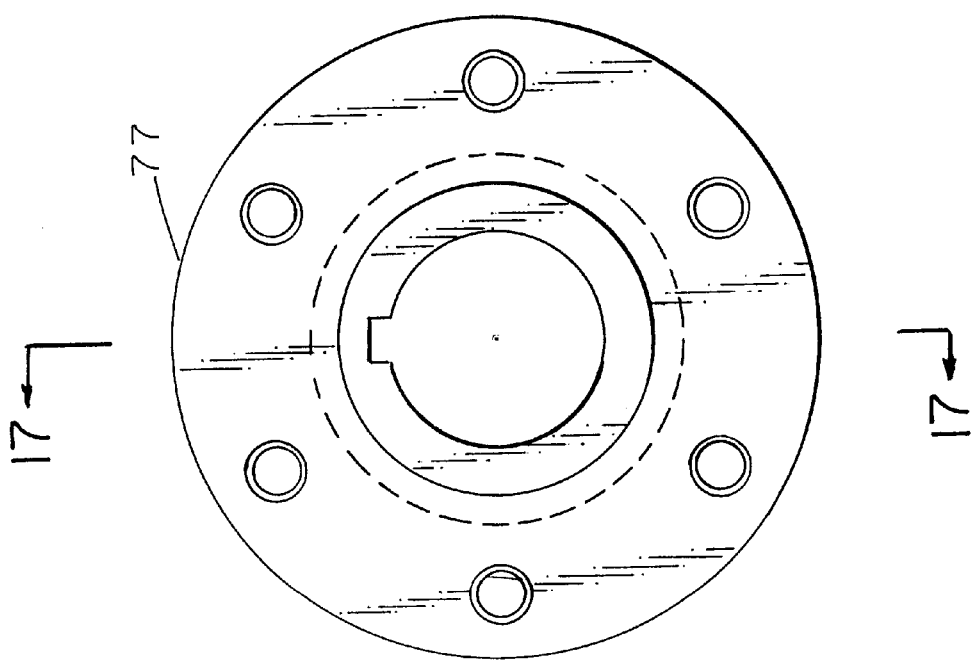
FIG. 16 is a front elevational view of the preferred embodiment of drive hub.

Also as shown in FIGS. 1 and 2, a seal 73 is placed over the end 22 of the input shaft 20 and into the hole 56 on the back of the bell housing 50. A drive hub 77 is heat shrunk on to the end 22 of the input shaft 20 and secured into place with a key 74. Before placing the drive hub 77 on the shaft 20, it should be heated to approximately 300 to 350 degrees F. before being placed on the end 22 of the output shaft 20 and allowed to cool. It will be necessary to heat the drive hub 77 back up in order to remove it from the input shaft 20. A drive plate 78 is bolted onto the drive hub 77 with bolts 91 as shown in FIGS. 1 and 2. The drive plate 78 is to bolt to the flywheel of the engine 8. The end 22 of the input shaft 20 is mounted to the crankshaft of the engine 8. A crankshaft of a typical 8 is recessed 80 for receiving a replaceable pilot bushing 76. The pilot bushing 76 is heat shrunk onto the input shaft by heating it up to 250 degrees F. and letting the pilot bushing 76 cool after having one side of the pilot bushing 76 placed around the end 22 of the input shaft 20. The other side of the pilot bushing 76 is plug-fitted into the crankshaft of the engine 8 as shown in FIG. 18.

Preferably a magnetic oil drain plug 18 is threaded into the oil drain hole 15 as shown in FIG. 1. Also, once the transmission is filled with oil through the fill hole 13, a filler plug 16 is threaded in the fill hole 13 as shown in FIG. 1. As shown in FIGS. 1, 3 and 5, an oil level plug 17 is positioned in the main gear case 12 in an oil level hole 14.

The present disclosure includes that contained in the appended claims, as well as that of the foregoing description. Although this invention has been described in its preferred form with a certain degree of particularity, it should be understood that the present disclosure of the preferred form has been made only by way of example and that numerous changes in the details of construction and the combination and arrangement of parts may be resorted to without departing from the spirit and scope of the invention.

Now that the invention has been described,
What is claimed is:

1. A transmission for attachment to an engine comprising, in combination:
   a bell housing coupled to the engine;
   a main gear case coupled to said bell housing;
   an input shaft rotatably supported in both said main gear case and said bell housing;
   an output shaft rotatably supported in both said main gear case and said bell housing;
   a plurality of input shaft bearings;
   said plurality of input shaft bearings having an inner track and an outer track;
   a plurality of output shaft bearings;
   said plurality of output shaft bearings having an inner track and an outer track;
   said inner track of said plurality of input shaft bearings rotatably supporting said input shaft;
   said inner track of said plurality of output shaft bearings rotatable supporting said output shaft;
   said outer track of at least one of said plurality of input shaft bearings being coupled to said main gear case;
   said outer track of at least one of said plurality of input shaft bearings being coupled to said bell housing;
   said outer track of at least one of said plurality of output shaft bearings being coupled to said main gear case;
   said outer track of at least one of said plurality of output shaft bearings being coupled to said bell housing;
   said input and said output shafts being free of locking engagement with said inner track of said plurality of input shaft bearings and said inner track of said plurality of output shaft bearings, respectively, allowing longitudinal and rotational movement of both said input shaft and said output shaft; and
   a gear means for rotation with said input and output shafts, said gear means mounted to said input and output shafts.

2. The transmission as claimed in claim 1 wherein said bell housing and said main gear case each have a plurality of contrapositioned bearing bores, said plurality of bearing bores for receiving said outer track of said plurality of said input shaft bearings and said outer track of said plurality of output shaft bearings.

3. The transmission as claimed in claim 1 wherein an opening is created between said bell housing and the engine when said bell housing is adapted to the engine said opening for cooling.

4. A transmission for attachment to an engine comprising, in combination:
   a bell housing coupled to the engine;
   a main gear case coupled to said bell housing;
   a semi-floating input shaft rotatable supported in both said main gear case and said bell housing;
   a semi-floating output shaft rotatable supported in both said main gear case and said bell housing;
   a plurality of bearings semi-floating about said semi-floating input and output shafts, said plurality of said bearings coupled to said main gear case, and said semi-floating input and said semi-floating output shafts being free of locking engagement with said plurality of bearings allowing longitudinal and rotational movement of both said input shaft and said output shaft;
   an opening is created between said bell housing and the engine when said bell housing is adapted to the engine, said opening for cooling;
   a peripheral edge of said bell housing partially extends above the engine when said bell housing is adapted thereto, said opening thereby becoming an air induction duct; and
   a gear means for rotation with said semi-floating input and output shafts, said gear means mounted to said semi-floating input and output shafts.

5. A transmission for attachment to an engine comprising, in combination:
- a bell housing coupled to the engine;
- a main gear case coupled to said bell housing;
- a semi-floating input shaft rotatable supported in both said main gear case and said bell housing;
- a semi-floating output shaft rotatable supported in both said main gear case and said bell housing;
- a plurality of bearings semi-floating about said semi-floating input and output shafts, said plurality of said bearings coupled to said main gear case, and said semi-floating input and said semi-floating output shafts being free of locking engagement with said plurality of bearings allowing longitudinal and rotational movement of both said input shaft and said output shaft;
- a vent means for venting said main gear case, said venting means aligned with said output shaft, said output shaft being at least partially hollow and adapted to rotate about said vent means; and
- a gear means for rotation with said semi-floating input and output shafts, said gear means mounted to said semi-floating input and output shafts.

6. A transmission for attachment to an engine comprising, in combination:
- a bell housing coupled to the engine;
- a main gear case coupled to said bell housing;
- an input shaft rotatably supported in both said main gear case and said bell housing;
- an output shaft rotatably supported in both said main gear case and said bell housing, said output shaft being at least partially hollow;
- a vent means for venting said main gear case, said venting means aligned with said output shaft, said output shaft rotating about said vent means;
- a plurality of bearings about said input and output shafts, and said plurality of said bearings coupled to said main gear case; and
- a gear means for rotation with said input and output shafts, said gear means coupled to said input and output shafts.

7. The transmission as claimed in claim 6 wherein said vent means is a vent tube.

8. The transmission as claimed in claim 6 wherein said input and output shafts are semi-floating, said semi-floating input and output shafts being free of locking engagement with said plurality of bearings allowing longitudinal and rotational movement of both said input shaft and said output shaft.

9. The transmission as claimed in claim 6 wherein said bell housing and said main gear case each have a plurality of contrapositioned bearing bores, said plurality of bearing bores for receiving said plurality of bearings.

10. The transmission as claimed in claim 6 further comprising an opening for cooling created between said bell housing and the engine when said bell housing is adapted to the engine, and said vent means venting to said bell housing.

11. The transmission as claimed in claim 6 adapted for use with propeller driven vehicles.

12. A transmission for attachment to an engine comprising, in combination:
- a bell housing coupled to the engine;
- a main gear case coupled to said bell housing;
- an input shaft rotatably supported in both said main gear case and said bell housing;
- an output shaft rotatably supported in both said main gear case and said bell housing;
- an opening created between said bell housing and the engine when said bell housing is adapted to the engine, a peripheral edge of said bell housing partially extends above the engine when said bell housing is adapted thereto, said opening thereby becoming an air induction duct, said opening for cooling;
- a plurality of bearings about said input and output shafts, and said plurality of said bearings coupled to said main gear case; and
- a gear means for rotation with said input and output shafts, said gear means coupled to said input and output shafts.

13. The transmission as claimed in claim 12 further comprising:
- a plurality of input shaft bearings;
- said plurality of input shaft bearings having an inner track and an outer track;
- a plurality of output shaft bearings;
- said plurality of output shaft bearings having an inner track and an outer track;
- said inner track of said plurality of input shaft bearings rotatable supporting said input shaft;
- said inner track of said plurality of output shaft bearings rotatable supporting said output shaft;
- said outer track of at least one of said plurality of input shaft bearings being coupled to said main gear case;
- said outer track of at least one of said plurality of input shaft bearings being coupled to said bell housing;
- said outer track of at least one of said plurality of output shaft bearings being coupled to said main gear case;
- said outer track of at least one of said plurality of output shaft bearings being coupled to said bell housing; said input and output shafts being free of locking engagement with said inner track of said plurality of input shaft bearings and said inner track of said plurality of output shaft bearings, respectively allowing longitudinal and rotational movement of both said input shaft and said output shaft.

14. The transmission as claimed in claim 12 wherein said bell housing and said main gear case each have a plurality of contrapositioned bearing bores, said plurality of bearing bores for receiving said plurality of bearings.

15. A transmission for attachment to an engine comprising, in combination:
- a bell housing coupled to the engine;
- a main gear case coupled to said bell housing;
- an input shaft rotatable supported in both said main gear case and said bell housing;
- an output shaft rotatable supported in both said main gear case and said bell housing;
- an opening created between said bell housing and the engine when said bell housing is adapted to the engine, said opening for cooling;
- a plurality of bearings about said input and output shafts, and said plurality of said bearings coupled to said main gear case;
- a vent means coupled to said bell housing for venting said main gear case, said venting means aligned with said output shaft and venting to said bell housing, said output shaft being at least partially hollow and adapted to rotate about said vent means; and a gear means for rotation with said input and output shafts, said gear means coupled to said input and output shafts.

16. A transmission for attachment to an engine comprising, in combination:

a bell housing coupled to the engine;

a main gear case coupled to said bell housing;

an input shaft rotatable supported in both said main gear case and said bell housing;

an output shaft rotatably supported in both said main gear case and said bell housing;

an opening created between said bell housing and the engine when said bell housing is adapted to the engine, said opening for cooling;

a plurality of bearings about said input and output shafts, and said plurality of said bearings coupled to said main gear case;

a peripheral edge of said bell housing partially extends above the engine when said bell housing is adapted thereto, said opening thereby becoming an air induction duct; and a gear means for rotation with said input and output shafts, said gear means coupled to said input and output shafts.

17. A transmission for attachment to an engine comprising, in combination:

a bell housing coupled to the engine;

a main gear case coupled to said bell housing;

a semi-floating input shaft rotatably supported in both said main gear case and said bell housing;

a semi-floating output shaft rotatably supported in both said main gear case and said bell housing, said semi-floating output shaft being at least partially hollow;

said bell housing and said main gear case each have a plurality of contrapositioned bearing bores;

an opening created between said bell housing and the engine when said bell housing is adapted to the engine, said opening for cooling;

a vent tube coupled to said bell housing for venting said main gear case, said vent tube aligned with said semi-floating output shaft, said semi-floating output shaft adapted to rotate about said vent tube;

a plurality of bearings about said input and output shafts, said plurality of said bearings coupled to said main gear case, said plurality of bearing bores for receiving said plurality of bearings, and said semi-floating input and said semi-floating output shafts being free of locking engagement with said plurality of bearings allowing longitudinal and rotational movement of both said semi-floating input shaft and said semi-floating output shaft; and a gear means for rotation with said input and output shafts, said gear means mounted to said input and output shafts.

* * * * *

UNITED STATES PATENT AND TRADEMARK OFFICE
CERTIFICATE OF CORRECTION

PATENT NO. : 5,911,793
DATED : Jun. 15, 1999
INVENTOR(S) : Kenneth B. Kaye

It is certified that error appears in the above-indentified patent and that said Letters Patent is hereby corrected as shown below:

Col. 8, Line 13,
delete "rotatable" and insert --rotatably--.

Col. 8, Line 40,
after "engine" insert --,--.

Col. 8, Line 46,
delete "rotatable" and insert --rotatably--.

Col. 8, Line 48,
delete "rotatable" and insert --rotatably--.

Col. 9, Line 6,
delete "rotatable" and insert --rotatably--.

Col. 9, Line 8,
delete "rotatable" and insert --rotatably--.

UNITED STATES PATENT AND TRADEMARK OFFICE
CERTIFICATE OF CORRECTION

PATENT NO. : 5,911,793
DATED : Jun. 15, 1999
INVENTOR(S) : Kenneth B. Kaye

It is certified that error appears in the above-indentified patent and that said Letters Patent is hereby corrected as shown below:

```
Col. 10, Line 26,
delete "rotatable" and insert --rotatably--.

Col. 10, Line 28,
delete "rotatable" and insert --rotatably--.

Col. 10, Line 41,
after "respectively" insert --,--.

Col. 10, Line 52,
delete "rotatable" and insert --rotatably--.

Col. 10, Line 54,
delete "rotatable" and insert --rotatably--.

Col. 11, Line 8,
delete "rotatable" and insert --rotatably--.
```

Signed and Sealed this

Sixteenth Day of November, 1999

Attest:

Q. TODD DICKINSON

*Attesting Officer*   *Acting Commissioner of Patents and Trademarks*